(12) United States Patent
Shon

(10) Patent No.: US 6,911,635 B2
(45) Date of Patent: Jun. 28, 2005

(54) COOKING APPARATUS AND METHOD

(75) Inventor: Jong-Chull Shon, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/739,070

(22) Filed: Dec. 19, 2003

(65) Prior Publication Data

US 2004/0226943 A1 Nov. 18, 2004

(30) Foreign Application Priority Data

May 14, 2003 (KR) ................................ 10-2003-0030673

(51) Int. Cl.[7] ................................................ H05B 6/68
(52) U.S. Cl. ................ 219/708; 219/518; 177/210 C; 177/245
(58) Field of Search ........................ 219/708, 704, 219/702, 705, 707, 746, 747, 762, 400, 750, 518, 754; 177/210 C, 1, 210 R, 144, 177

(56) References Cited

U.S. PATENT DOCUMENTS

| 4,442,911 | A | | 4/1984 | Fukuda | |
| 4,683,967 | A | * | 8/1987 | Hanatani et al. | 177/144 |
| 4,724,292 | A | * | 2/1988 | Ichikawa | 219/708 |
| 5,302,792 | A | * | 4/1994 | No et al. | 219/754 |
| 5,463,207 | A | * | 10/1995 | Kang | 219/708 |

OTHER PUBLICATIONS

Korean Patent Abstracts for Publication No. 1020020305049 dated Jul. 25, 2001.

* cited by examiner

*Primary Examiner*—Quang T. Van
(74) *Attorney, Agent, or Firm*—Staas & Haslsey LLP

(57) ABSTRACT

A cooking apparatus includes a cooking cavity to accommodate food to be cooked therein and a rotating unit to rotate while supporting the food. The rotating unit is installed within the cooking cavity to rotate by at least one roller which is in rolling contact with a bottom surface of the cooking cavity. A weight sensor is installed at a portion of the cooking cavity on a movement path of the roller to be temporarily pressurized by the roller when the rotating unit rotates. The weight sensor generates a load output signal according to a pressurized degree when the weight sensor is pressured by the roller, and generates a no-load output signal when the weight sensor is not pressurized by the roller. A control unit calculates a difference between the load output signal and the no-load output signal, and converts the difference to a weight of the food.

28 Claims, 7 Drawing Sheets ively detect the amount of food, and cooks the
COOKING APPARATUS AND METHOD

CROSS-REFERENCE TO RELATED APPLICATIONS

This application claims the benefit of Korean Application No. 2003-30673, filed May 14, 2003, in the Korean Intellectual Property Office, the disclosure of which is incorporated herein by reference.

BACKGROUND OF THE INVENTION

1. Field of the Invention

The present invention relates, in general, to cooking apparatuses and, more particularly, to a cooking apparatus which precisely detects a weight of a food, and performs cooking for a suitable cooking time corresponding to the detected weight of the food.

2. Description of the Related Art

Generally, an automatic cooking apparatus, such as a gas/electric oven or microwave oven, automatically cooks food according to a previously set control method. The automatic cooking apparatus requires food information, such as a type and an amount of food, to automatically cook the food using a suitable amount of heat for a suitable cooking time.

The food information is provided by a user through an input unit of the automatic cooking apparatus. If this food information is manually input by the user, the user must use a separate weight detecting unit so as to precisely detect the amount of the food. If the separate weight detecting unit is not provided, or if the user regards the use of the separate weight detecting unit as labor, which is troublesome, to roughly estimate the amount of food and inputs the estimated amount of the food to the automatic cooking apparatus, errors may be generated between the actual amount of the food and the input food information. Due to the errors, a control unit of the automatic cooking apparatus may not determine the suitable cooking time and the suitable amount of heat, thus the quality of the food may deteriorate.

SUMMARY OF THE INVENTION

Accordingly, it is an aspect of the present invention to provide a cooking apparatus and method, which automatically and precisely detects the amount of food, and cooks the food for a suitable cooking time corresponding to the detected amount of the food, thus providing optimal cooking results.

It is another aspect to provide a cooking apparatus and method, which may emit a zero point correction of a sensor that detects the amount of food at a time of detecting the amount of food.

Additional aspects and/or advantages of the invention will be set forth in part in the description which follows and, in part, will be obvious from the description, or may be learned by practice of the invention.

The above and/or other aspects are achieved by providing a cooking apparatus including a cooking cavity to accommodate food to be cooked therein, and a rotating unit to rotate while supporting the food. The rotating unit is installed within the cooking cavity to rotate by at least one roller which is in rolling contact with a bottom surface of the cooking cavity. A weight sensor is installed at a portion on a movement path of the at least one roller to be temporarily pressurized by the at least one roller when the rotating unit rotates. The weight sensor generates at least one load output signal according to a pressurized degree when the weight sensor is pressurized by the at least one roller, and generates at least one no-load output signal when the weight sensor is not pressurized by the at least one roller. A control unit calculates at least one difference between the at least one load output signal and the at least one no-load output signal, and converts the at least one difference to a weight of the food.

The above and/or other aspects are achieved by providing a method of detecting a weight of food of a cooking apparatus. In the food weight detection method, obtaining at least one load output signal according to a pressurized degree from a weight sensor when the weight sensor is pressurized by at least one roller, and obtaining at least one no-load output signal from the weight sensor when the weight sensor is not pressurized by the at least one roller. If the load and no-load output signals are obtained, calculating at least one difference between the at least one no-load output signal and the at least one load output signal, and converting the at least one difference to the weight of the food according to relation data on the weight of the food to an intensity of an output signal of the weight sensor.

The above and/or other aspects are achieved by providing a cooking method of a cooking apparatus. In the cooking method, while cooking occurs and the rotating unit rotates, at least one load output signal according to a pressurized degree is obtained from a weight sensor when the weight sensor is pressurized by at least one roller, and at least one no-load output signal is obtained from the weight sensor when the weight sensor is not pressurized by the at least one roller. If the load and no-load output signals are obtained, at least one difference between the no-load output signal and the load output signal is calculated, and the at least one difference is converted to a weight of the food according to relation data on the weight of the food to an intensity of an output signal of the weight sensor. After the weight conversion is complete, a cooking condition corresponding to the weight of the food is determined to perform cooking.

BRIEF DESCRIPTION OF THE DRAWINGS

These and/or other aspects and advantages of the invention will become apparent and more readily appreciated from the following description of an embodiment, taken in conjunction with the accompanying drawings of which.

DETAILED DESCRIPTION OF THE PREFERRED EMBODIMENT

Figure 1:
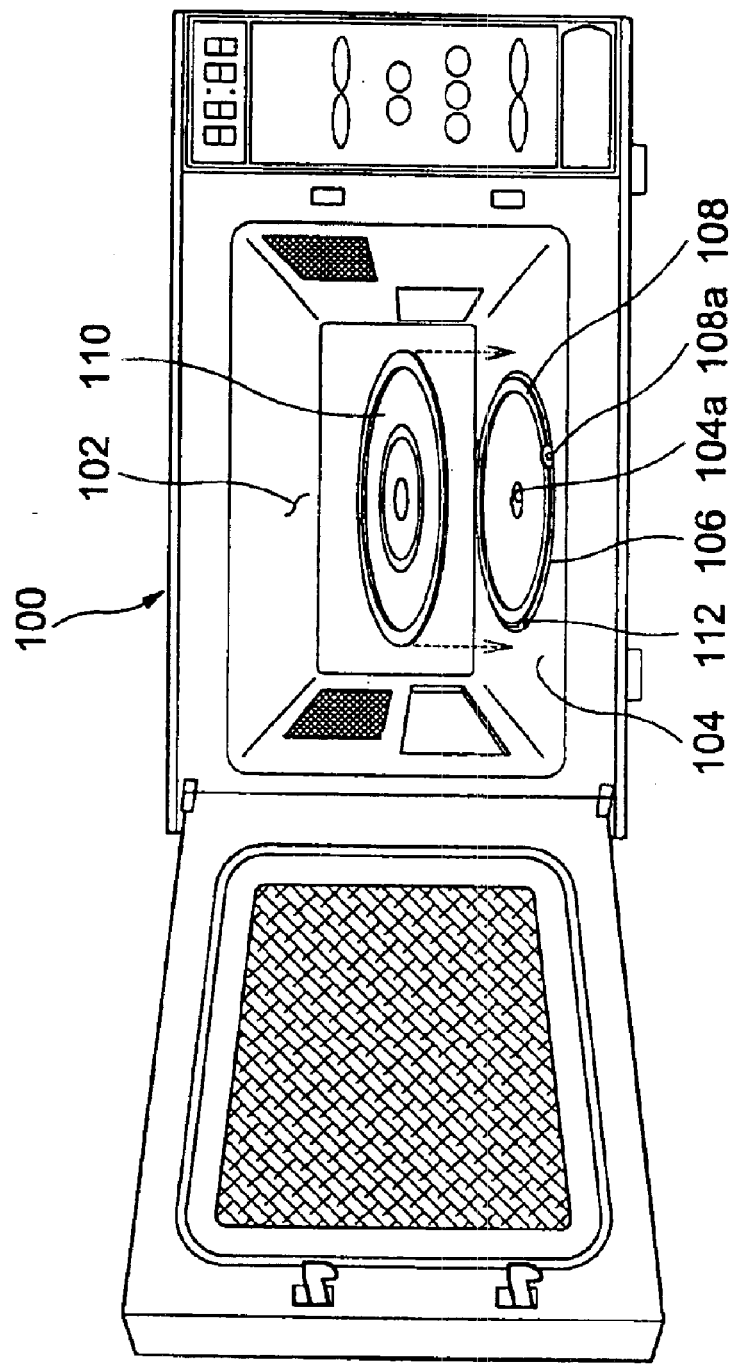
FIG. 1 is a view showing a microwave oven, according to an embodiment of the present invention.

Reference will now be made in detail to the embodiment of the present invention, examples of which are illustrated in the accompanying drawings, wherein like reference numerals refer to like elements throughout. The embodiment is described below in order to explain the present invention by referring to the figures.

FIG. 1 is a view showing a microwave oven 100, according to an embodiment of the present invention. As shown in FIG. 1, a cooking cavity 102 of a microwave oven 100 is provided with a tray 110 to allow food to be placed and rotated thereon. A tray motor (not shown) is installed below the cooking cavity 102 to rotate the tray 110. The tray motor and the tray 110 are mechanically combined with each other through a pivot 104a to rotate together. Rollers 108a and a roller guide 108 are installed below the tray 110. The tray 110 may rotate smoothly on a bottom surface 104 of the cooking cavity 102 without inclining or vibrating by operations of the rollers 108a. A track 106 is formed on the bottom surface 104 of the cooking cavity 102 to allow the rollers 108a to move along a certain path. A weight sensor 112, which detects a weight of food, is installed at any one portion of the track 106. The weight sensor 112 is used to automatically detect the weight of the food on the tray 110.

Figure 2:
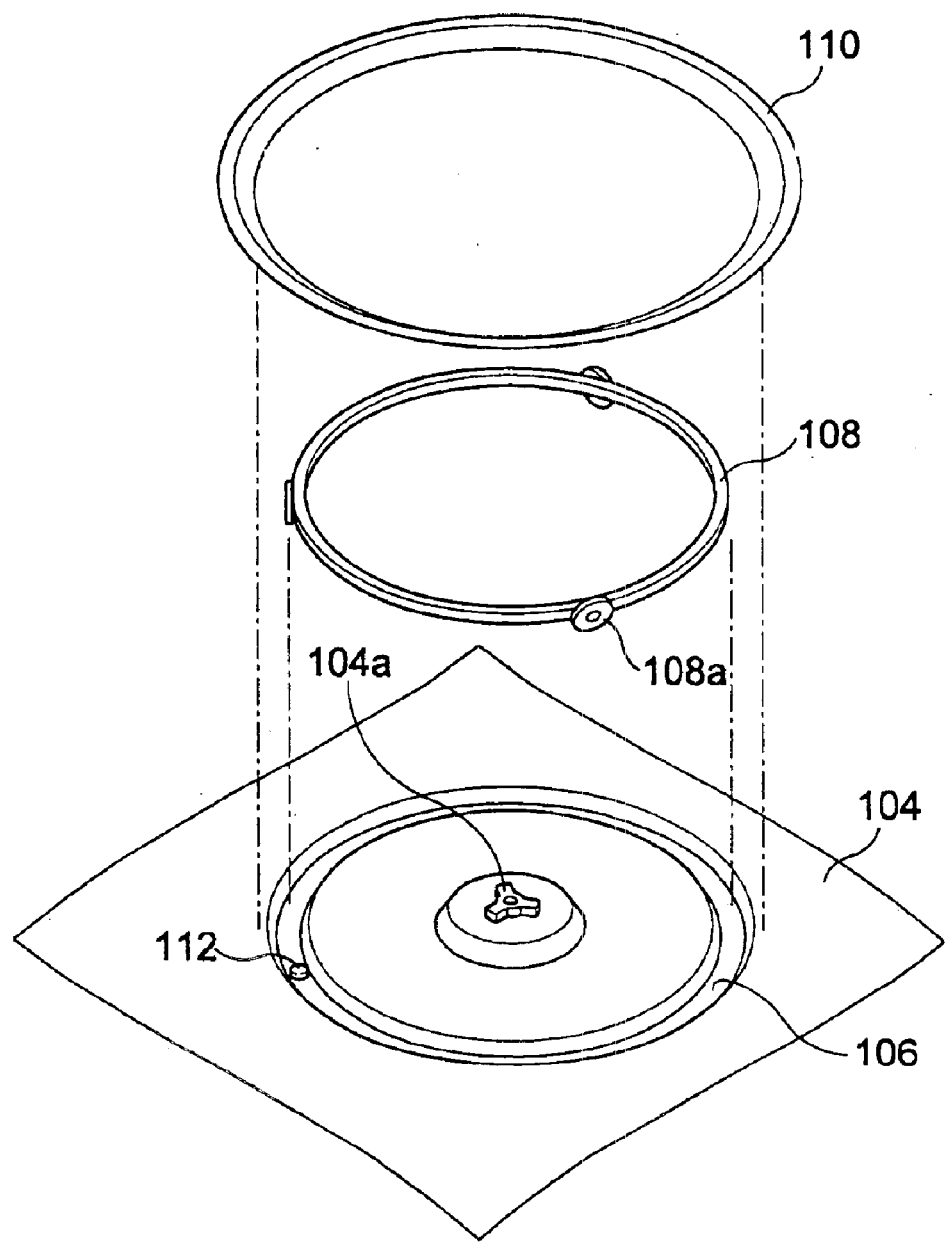
FIG. 2 is a view showing a rotating unit of the microwave oven of FIG. 1.

FIG. 2 is a view showing a rotating unit of the microwave oven of FIG. 1. As shown in FIG. 2, the rotating unit includes the tray 110, the rollers 108a, the roller guide 108 and the pivot 104a. Food in the cooking cavity 102 rotates by the rotating unit. The rollers 108a are installed, for example, at three portions of a side of the roller guide 108 to be in rolling contact with the track 106 formed on the bottom surface 104 of the cooking cavity 102. While the roller guide 108 rotates, the three rollers 108a pass over the weight sensor 112 while moving along the track 106. Each of the rollers 108a pressurizes the weight sensor 112 while passing over the weight sensor 112. The weight sensor 112 generates an electrical signal according to a pressurized degree. When each of the rollers 108a pressurizes the weight sensor 112, the pressurized degree corresponds to the weight of a load (i.e., the food) on the tray 110. The electrical signal generated by the weight sensor 112, at this time when the load is applied to the weight sensor 112, is called a load output signal. After each of the rollers 108a deviates from a position at which the weight sensor 112 is installed, no load is applied to the weight sensor 112. An electrical signal generated by the weight sensor 112, at this time (i.e., when the load is not applied to the weight sensor 112), is called a no-load output signal.

Figure 3:
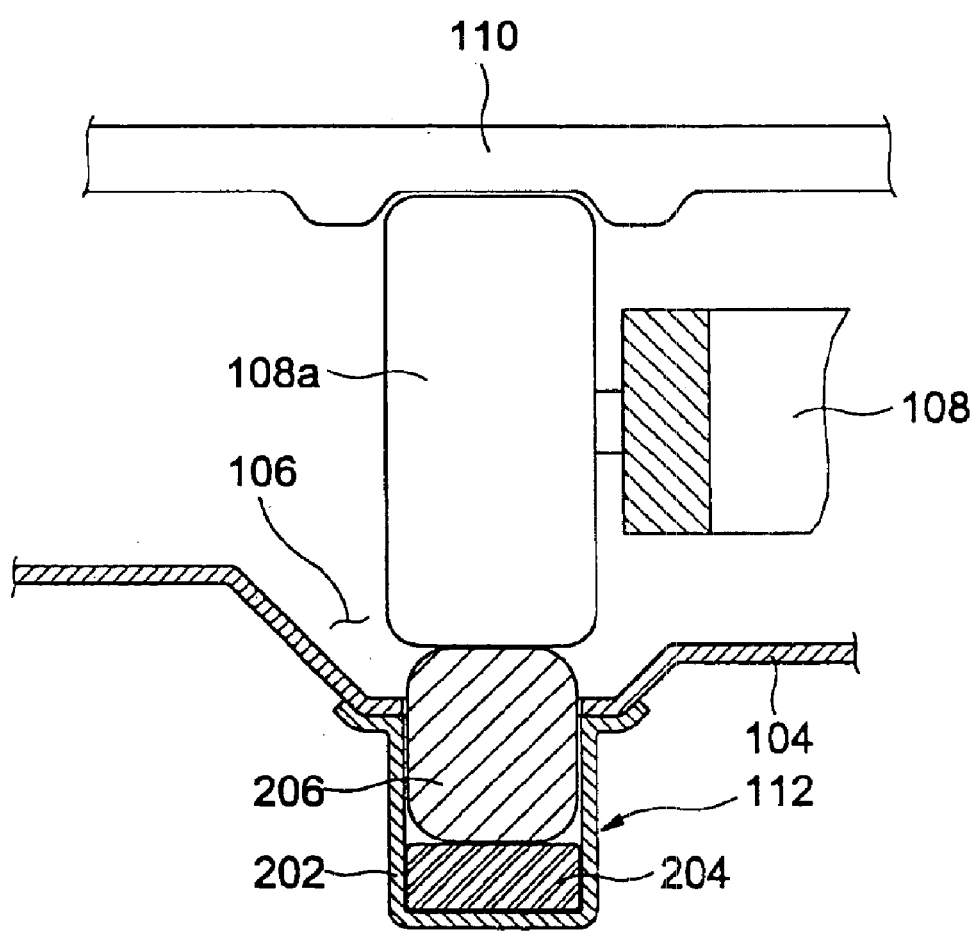
FIG. 3 is a sectional view showing the rotating unit and a track of FIG. 2.

FIG. 3 is a sectional view showing a rotating unit and the track of FIG. 2. As shown in FIG. 3, the weight sensor 112 is installed below the track 106. The weight sensor 112 includes a semiconductor pressure sensor 204 and a pressurizing unit 206 inserted into a casing 202. A part of the pressurizing unit 206 is projected upward from the track 106 through a hole formed in the track 106. When the rollers 108a pass over the pressurizing unit 206, the semiconductor pressure sensor 204 is pressurized by the weight of the food on the tray 110, and electrical characteristics of the semiconductor pressure sensor 204 vary according to the pressurized degree. The variation of the electrical characteristics of the semiconductor pressure sensor 204 causes the variation of an intensity of an output signal thereof.

Figure 4:
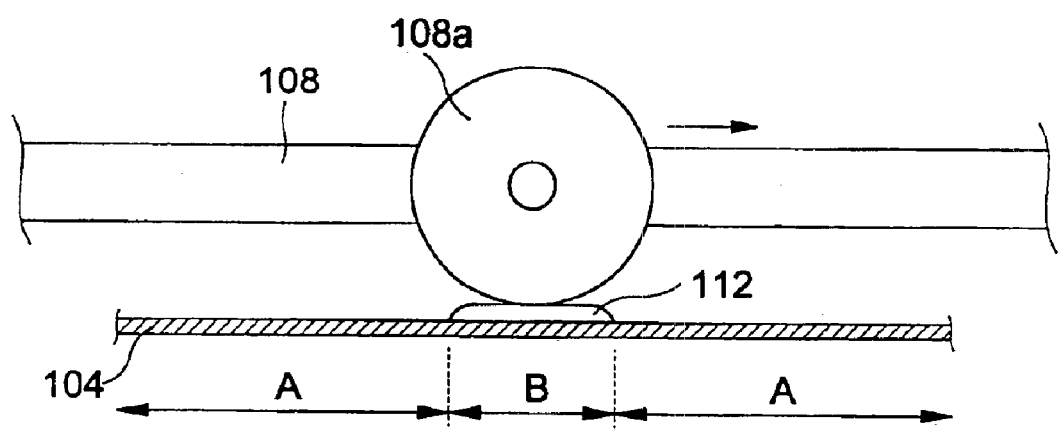
FIG. 4 is a view showing periods to obtain a load output signal and a no-load output signal according to a rotation of the rotating unit of FIG. 2.

FIG. 4 is a view showing periods to obtain the load output signal and the no-load output signal according to a rotation of the rotating unit of FIG. 2. As shown in FIG. 4, while the roller guide 108 rotates in a direction of an arrow (i.e., one of a clockwise and counterclockwise direction), the weight sensor 112 is not pressurized during a period A, and is temporarily pressurized only during a period B. Therefore, the no-load output signal may be obtained from the weight sensor 112 during the period A, and the load output signal may be obtained from the weight sensor 112 during the period B.

Since the weight sensor 112 is pressurized by the three rollers 108a while the roller guide 108 rotates one revolution, three load output signals may be obtained while the roller guide 108 rotates the one revolution. To precisely detect the weight of the food, a plurality of the load output signals may be obtained and then a mean value thereof may be taken. For example, while the roller guide 108 rotates for three revolutions, a total of nine load output signals are obtained. Among the nine load output signals, a mean value is calculated from seven of the nine load output signals and maximum and minimum load output values of the nine load output signals are disregarded. The reason to omit the maximum and minimum load output values is to exclude an abnormal output signal due to an inflow of noise. Since a period to obtain the no-load output signals is wider than those of the load output signals, a great number of no-load output signals may be obtained through a periodic sampling operation and a mean value thereof may be taken of the obtained no-load output signals even during a period to obtain the no-load output signals.

Figure 5:
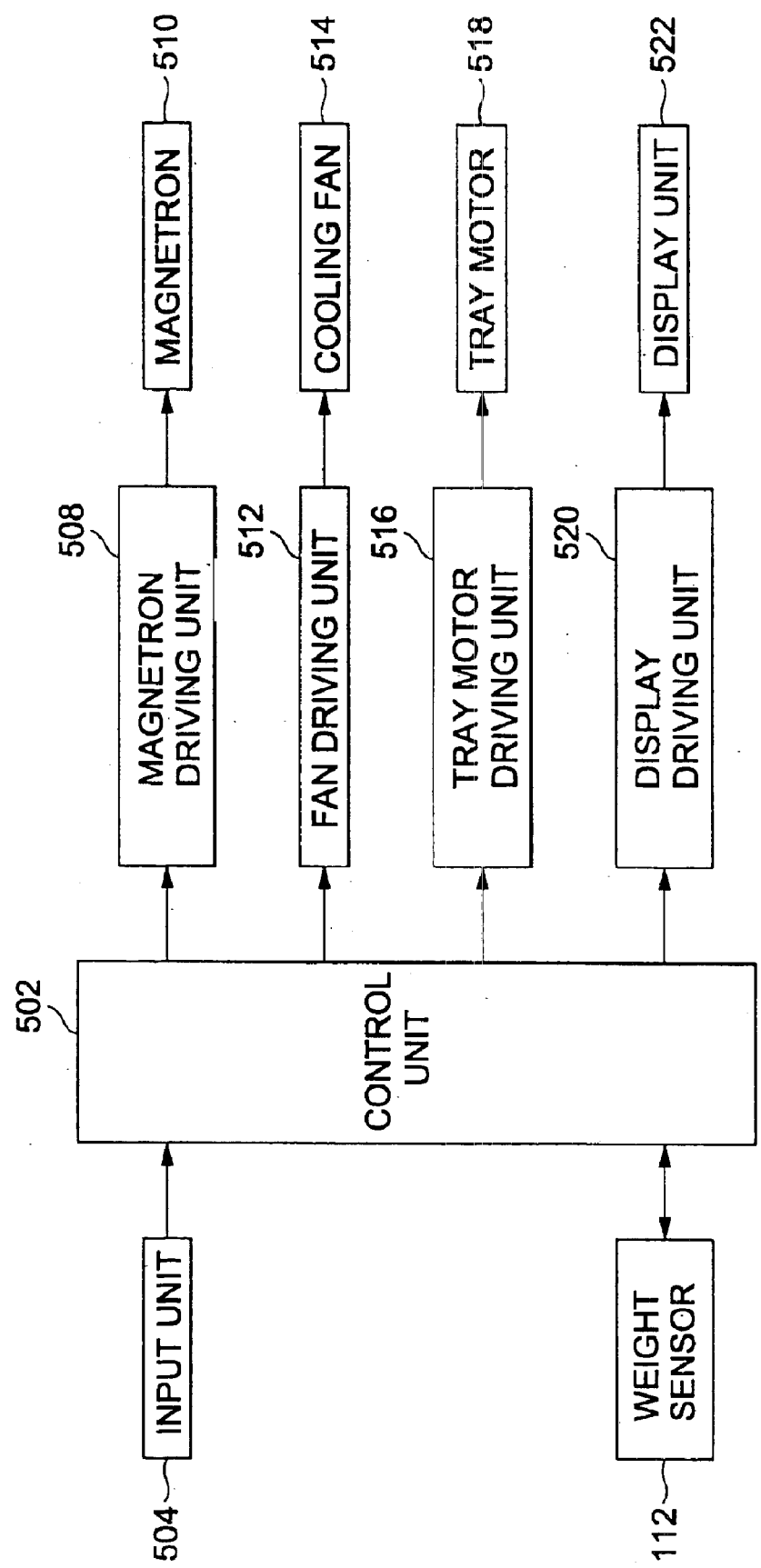
FIG. 5 is a block diagram of a control system of the microwave oven of FIG. 1.

FIG. 5 is a block diagram of a control system of the microwave oven 100 of FIG. 1. As shown in FIG. 5, an input port of a control unit 502, which controls an entire operation of the microwave oven 100, is connected to an input unit 504 and the weight sensor 112. In the input unit 504, a cooking mode setting button or a number button is provided to allow the user to input a cooking condition. As described above, the weight sensor 112 is used to automatically detect the weight of the food. An output port of the control unit 502 is connected to a magnetron driving unit 508, a fan driving unit 512, a tray motor driving unit 516 and a display driving unit 520. The magnetron driving unit 508 drives the magnetron 510 to generate microwaves. The fan driving unit 512 drives a cooling fan 514 to prevent various electrical devices mounted in a mechanical room (not shown) of the microwave oven 100 from overheating. The tray motor driving unit 516 drives a tray motor 518 to rotate the tray 110 in the cooking cavity 102. The display driving unit 520 drives a display unit 522 to display, for example, a help message necessary to cook, cooking information and a current set value.

The control unit 502 of FIG. 5 calculates a difference between the load and no-load output signals, and converts the difference to the weight of the food according to relation data on the weight of the food to an intensity of an output signal of the weight sensor 112. Further, the control unit 502 determines a cooking condition, such as a cooking time and an amount of heat (output power of the magnetron) corresponding to the weight of the food obtained by the converting, and performs cooking depending on the cooking condition. The relation data on the weight of the food to the output signal intensity of the weight sensor 112 are obtained through experiments. A lookup table for the relation data is provided in the control unit 502, so that the control unit 502 calculates the weight of food according to (i.e., with reference to) the relation data in the lookup table at the time of detecting the weight of the food.

As described above, when a great number of cooking apparatuses, each employing a weight sensor, are produced, results obtained by detecting the weight of the food under the control of control units may be uniformly maintained only when characteristics of weight sensors installed in the respective cooking apparatuses are all equal. For example, in a case of a semiconductor pressure sensor, a separate trimming operation is performed to allow the characteristics of all of the semiconductor pressure sensors to be equal. The trimming operation is a main factor in increasing costs of the semiconductor pressure sensors. If the trimming operation is omitted, the costs of the semiconductor pressure sensors may be greatly decreased. Moreover, the costs of cooking apparatuses employing the semiconductor pressure sensors, as weight sensors, also may be greatly decreased.

Since the cooking apparatus detects the weight of the food through a relative difference between a load weight and a no-load weight, the trimming operation of the weight sensor or a zero point correction performed, after an installation of the weight sensor, is not required. That is, the cooking apparatus always obtains a same weight detection result with respect to the food with a certain weight even though the semiconductor pressure sensors having different electrical characteristics are used. This operation is described below with reference to FIG. 6.

Figure 6:
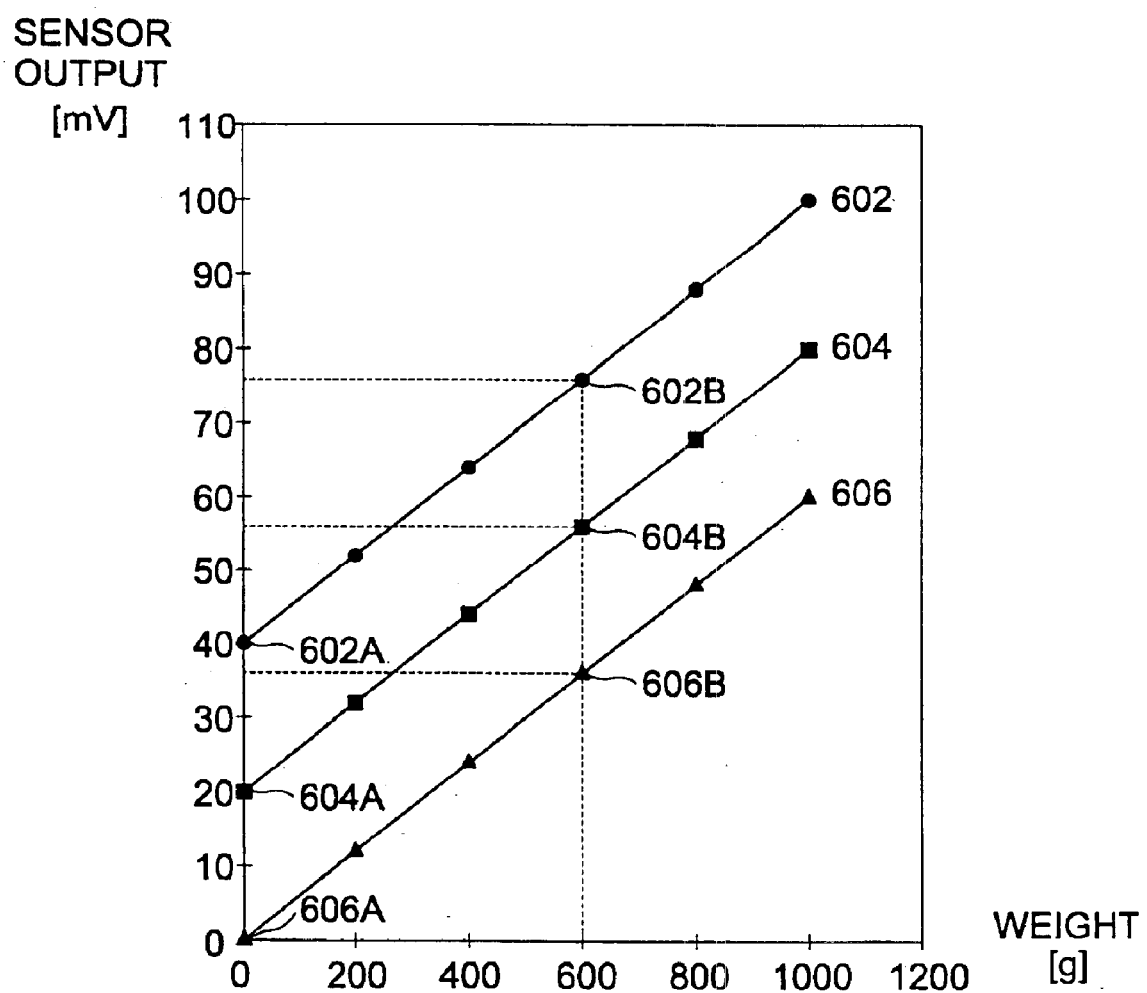
FIG. 6 is a view showing a detection of a weight of the food of a cooking apparatus, according to the embodiment of the present invention.

FIG. 6 is a view showing a detection of the weight of the food of the cooking apparatus of the embodiment of the present invention, and illustrates a graph showing the results obtained by detecting the weight of the same food using three semiconductor pressure sensors having different electrical characteristics. In FIG. 6, first to third weight detection curves 602, 604 and 606 are shown. In FIG. 6 initial sensor outputs 602A, 604A and 606A of the respective semiconductor pressure sensors are different (i.e., 40 mV, 20 mV and 0 mV, respectively), by referring to the first to three weight detection curves 602, 604 and 606. Since each of the semiconductor pressure sensors has a very linear characteristic, as a weight of food to be detected by each of the semiconductor pressure sensors is increased, an output variation of each of the semiconductor pressure sensors due to a rate of weight increase of the food are equal for all of the semiconductor pressure sensors even though the initial sensor outputs 602A, 604A and 606A are different. This means that slopes of output curves of the respective semiconductor pressure sensors are always constant. If these linear characteristics are used, the weight of the food may be precisely detected through a relative difference between the load weight and the no-load weight, as described above.

In FIG. 6, the initial sensor output 602A of the first weight detection curve 602 is 40 mV, and if the weight of a load is 600 g, a second sensor output 602B is 76 mV. An absolute value of a difference between the initial and second sensor outputs 602A and 602B of the first weight detection curve 602 is 36 mV. The initial sensor output 604A of the second weight detection curve 604 is 20 mV, and if the weight of a load is 600 g, a second sensor output 604B is 76 mV. An absolute value of a difference between the initial and second sensor outputs 604A and 604B of the second weight detection curve 604 is also 36 mV. The initial sensor output 606A of the third weight detection curve 606 is 0 mV, and if a weight of a load is 600 g, a second sensor output 606B is 36 mV. An absolute value of a difference between the initial and second sensor outputs 606A and 606B of the third weight detection curve is also 36 mV. Even though the initial sensor outputs 602A, 604A and 606A of the respective semiconductor pressure sensors are different at 40 mV, 20 mV and 0V, respectively, the respective detected weights are equally 600 g.

Figure 7:
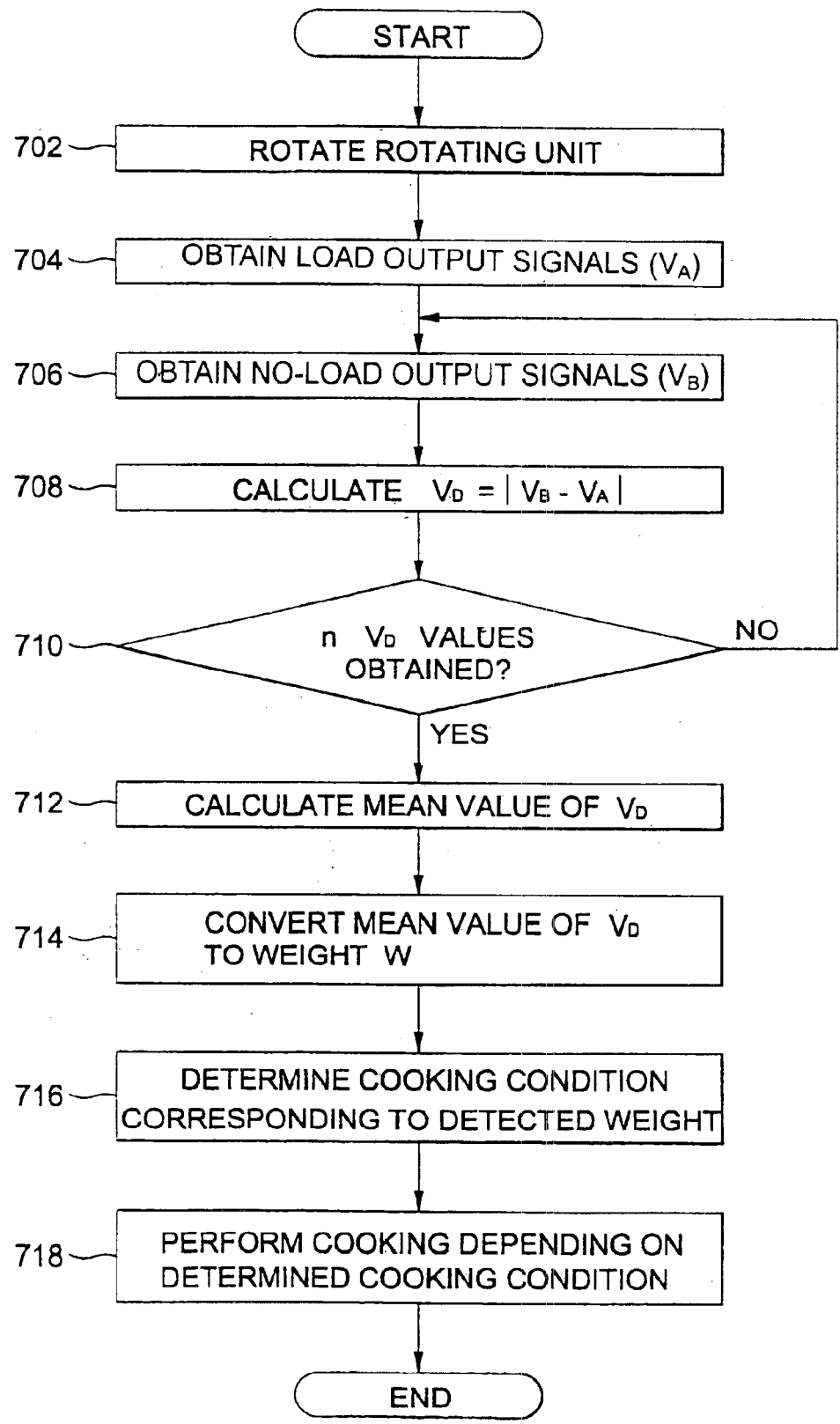
FIG. 7 is a flowchart of a cooking method of the microwave oven, according to the embodiment of the present invention.

FIG. 7 is a flowchart of a cooking method of the microwave oven, according to the embodiment of the present invention. As shown in FIG. 7, when cooking is started, the rotating unit including the rollers 108a, the roller guide 108 and the tray 110 rotates, and, simultaneously, food on the tray 110 rotates together with the rotating unit in operation 702. Further, the magnetron 510 operates to irradiate microwaves into the cooking cavity 102.

While the rotating unit rotates, the control unit 502 obtains no-load output signals $V_A$ according to a pressurized degree from the weight sensor 112 when the weight sensor 112 is pressurized by the rollers 108a in operation 704. The control unit 502 obtains load output signals $V_B$ from the weight sensor 112 when the weight sensor 112 is not pressurized by the rollers 108 in operation 706. The control unit 502 calculates differences $V_D$ between the load output signals $V_B$ and the no-load output signals $V_A$ in operation 708. If a preset number n of differences $V_D$ between the load output signals $V_B$ and the no-load output signals $V_A$ are obtained in operation 710, the control unit 502 calculates a mean value of the differences $V_D$ in operation 712, and converts the mean value to a weight W in operation 714.

The control unit 502 determines a cooking condition corresponding to the weight W of the food obtained through the above process in operation 716, and performs cooking depending on the determined cooking condition in operation 718. Further, the cooking condition determined by the control unit 502 may include, for example, a cooking time or an amount of heat (i.e., an output power of the magnetron).

As is apparent from the above description, a cooking apparatus and method are provided, which determine a weight of food through a relative difference between a load weight and a no-load weight, thus precisely measuring the weight of a food without a trimming operation of a semiconductor pressure sensor or a zero point correction performed after installation of the weight sensor. Further, the present invention is advantageous in that, since the cooking apparatus is not influenced by a temperature variation, a separate temperature compensation unit is not required.

Although an embodiment of the present invention has been shown and described, it would be appreciated by those skilled in the art that changes may be made in the embodiment without departing from the principles and spirit of the invention, the scope of which is defined in the claims and their equivalents.

What is claimed is:

1. A cooking apparatus, comprising:
   a cooking cavity to accommodate food to be cooked therein;
   a rotating unit installed within the cooking cavity to support the food and rotated by at least one roller which is in rolling contact with a bottom surface of the cooking cavity;
   a weight sensor installed at a portion on a movement path of the at least one roller to be temporarily pressurized by the roller when the rotating unit rotates, the weight sensor generating at least one load output signal according to a pressurized degree when the weight sensor is pressured by the at least one roller, and generating at least one no-load output signal when the weight sensor is not pressurized by the at least one roller; and
   a control unit to calculate at least one difference between the at least one load output signal and the at least one no-load output signal, and convert the at least one difference to a weight of the food.

2. The cooking apparatus according to claim 1, wherein the control unit converts the at least one difference between the at least one no-load output signal and the at least one load output signal to the weight of the food according to relation data on the weight of food to an intensity of an output signal of the weight sensor.

3. The cooking apparatus according to claim 1, wherein the weight sensor is a semiconductor pressure sensor to generate an electrical signal with an intensity corresponding to an external pressurized degree.

4. The cooking apparatus according to claim 1, wherein the weight sensor is a pressure sensor to generate an electrical signal with an intensity corresponding to an external pressurized degree.

5. The cooking apparatus according to claim 4, wherein the pressure sensor is a semiconductor pressure sensor.

6. A method of detecting a weight of food of a cooking apparatus, the cooking apparatus including a cooking cavity to accommodate food to be cooked therein, a rotating unit installed within the cooking cavity to support the food and rotated by at least one roller which is in rolling contact with a bottom surface of the cooking cavity, and a weight sensor installed at a portion of the cooking cavity on a movement path of the at least one roller to be temporarily pressurized by the at least one roller when the rotating unit rotates, the method comprising:

obtaining at least one load output signal according to a pressurized degree from the weight sensor when the weight sensor is pressurized by the at least one roller;

obtaining at least one no-load output signal from the weight sensor when the weight sensor is not pressurized by the at least one roller; and calculating at least one difference between the at least one no-load output signal and the at least one load output signal and converting the at least one difference to a weight of the food according to relation data on a weight of food to an intensity of an output signal of the weight sensor.

7. The food weight detection method according to claim 6, wherein the calculating of the at least one difference comprises:

obtaining a number of differences between the no-load output signals and the load output signals;

taking a mean value of remaining differences, except for maximum and minimum differences, among the number of differences; and converting the mean value to the weight of the food.

8. A cooking apparatus having a cooking cavity therein to accommodate food, comprising:

a support unit provided in the cooking cavity to movably support the food, and having a moving unit at a portion of a bottom of the cooking cavity to move along a movement path;

a weight sensor provided adjacent to a part of the movement path such that the weight sensor is loaded by the support unit when the moving unit is adjacent to the weight sensor and the weight sensor is not loaded by the support unit when the moving unit is not adjacent to the weight sensor, and detecting load and no-load conditions of the support unit based on a pressure exerted from the support unit when the weight sensor is loaded and not loaded, respectively, the load and no-load conditions alternating according to a movement of the moving unit; and a control unit to calculate a weight of the food on the support unit based on differences between the load and no-load conditions.

9. The cooking apparatus according to claim 8, wherein the weight sensor comprises:

a semiconductor pressure sensor; and a pressurizing unit, the semiconductor pressure sensor and the pressurizing unit being inserted into the bottom of the cooking cavity adjacent to the part of the movement path of the moving unit.

10. The cooking apparatus according to claim 8, wherein:

the bottom of the cooking cavity comprises:

a track formed along the movement path of the moving unit; and a part of the pressurizing unit projects upward from the track such that when the moving unit pass over the pressurizing unit, the semiconductor pressure sensor is pressurized by the weight of the support unit.

11. The cooking apparatus according to claim 8, wherein the control unit converts the differences between the no-load and load conditions to the weight of the food according to relation data on a weight of food to a magnitude of the differences between the load and no-load conditions.

12. The cooking apparatus according to claim 8, wherein the weight sensor is a pressure sensor to generate an electrical signal with an intensity corresponding to a pressure thereon.

13. The cooking apparatus according to claim 12, wherein the pressure sensor is a semiconductor pressure sensor.

14. A method of detecting a weight of food in a cooking apparatus, the cooking apparatus including a cooking cavity to accommodate food to be cooked therein, a support unit provided in the cooking cavity to movably support the food, and having a moving unit at a portion of a bottom of the cooking cavity to move along a movement path, and a weight sensor provided adjacent to a part of the movement path, the method comprising:

loading the weight sensor by the support unit when the moving unit is adjacent to the weight sensor;

unloading the weight sensor by the support unit when the moving unit is not adjacent to the weight sensor;

detecting load and no-load conditions of the support unit based on a pressure exerted from the support unit when the weight sensor is loaded and unloaded, respectively, while alternating the load and no-load conditions according to a movement of the moving unit; and calculating a weight of the food on the support unit based on differences between the load and no-load conditions.

15. The food weight detecting method according to claim 14, the method further comprises:

determining a cooking condition corresponding to the weight of the food to perform cooking.

16. The cooking method according to claim 15, wherein the cooking condition is a cooking time corresponding to the weight of the food.

17. The cooking method according to claim 15, wherein the cooking condition is an amount of heat corresponding to the weight of the food.

18. The food weight detection method according to claim 14, wherein the calculating of the differences comprises:

obtaining a number of differences between the no-load conditions and the load conditions;

calculating a mean value of remaining differences, except for maximum and minimum differences, among the number of differences; and converting the mean value of the remaining differences to the weight of the food.

19. A cooking apparatus having a cooking cavity therein to accommodate food, comprising:

a support unit to movably support the food;

a weight sensor provided under the support unit, and detecting load and no-load conditions of the support unit based on a pressure exerted from the support unit, and the load and no-load conditions alternating according to a movement of the support unit; and a control unit to calculate a weight of the food based on differences between the load and no-load conditions.

20. The cooking apparatus according to claim 19, wherein the support unit further comprises a moving unit moving along a movement path.

21. A method of detecting a weight of food in a cooking apparatus, the cooking apparatus including a cooking cavity to accommodate food to be cooked therein, a support unit provided in the cooking cavity to movably support the food, and a weight sensor provided at a part of a movement path of the support unit, the method comprising:

determining a weight of food through a relative difference between a load weight on the weight sensor and a no-load weight on the weight sensor, while the support unit moves on the movement path.

22. The food weight detection method according to claim 21, wherein the determining of the weight of the food is not influence by a temperature variation of the cooking apparatus.

23. The food weight detection method according to claim 21, wherein the determining of the weight of the food comprises:

alternately loading and unloading the weight sensor, as the support unit moves along the movement path;

detecting load and no-load conditions of the support unit based on a pressure exerted from the support unit; and calculating a weight of the food on the support unit based on differences between the load and no-load conditions.

24. The food weight detection method according to claim 21, wherein the weight sensor is provided adjacent to the support unit.

25. The food weight detecting method according to claim 21, the method further comprises:

determining a cooking condition corresponding to the weight of the food to perform cooking.

26. The food weight detection method according to claim 25, wherein a cooking condition is a cooking time corresponding to the weight of the food.

27. The food weight detection method according to claim 25, wherein the cooking condition is an amount of heat corresponding to the weight of the food.

28. The food weight detection method according to claim 23, wherein:

the detecting of the load and no-load conditions of the support unit comprises:

detecting a greater number of the no-load conditions than those of the load conditions;

determining a mean value of the no-load conditions; and the calculating of the weight of the food on the support unit comprises:

calculating of the weight of the food on the support unit based on differences between the load conditions and the mean value of the no-load conditions.

* * * * *

UNITED STATES PATENT AND TRADEMARK OFFICE
CERTIFICATE OF CORRECTION

| | |
|---|---|
| PATENT NO. | : 6,911,635 B2 |
| APPLICATION NO. | : 10/739070 |
| DATED | : June 28, 2005 |
| INVENTOR(S) | : Jong-Chull Shon |

It is certified that error appears in the above-identified patent and that said Letters Patent is hereby corrected as shown below:

Replace claims 1, 2, 6-8, 14, 15, 19, 21, 22, and 24 with the following claims:
--1. A cooking apparatus, comprising:
a cooking cavity to accommodate food to be cooked therein;
a rotating unit installed within the cooking cavity to support the food and rotated by rollers which are in rolling contact with a bottom surface of the cooking cavity;
a weight sensor installed at a portion on a movement path of the at least one roller to be temporarily pressurized by the rollers when the rotating unit rotates, the weight sensor generating load output signals according to a pressurized degree when the weight sensor is pressured by the rollers, and generating no-load output signals when the weight sensor is not pressurized by the rollers; and
a control unit to calculate a difference between the load output signals and the no-load output signals, wherein when a preset number of differences is met, the control unit calculates a mean value of the differences and converts the mean value to a weight of the food.

2. The cooking apparatus according to claim 1, wherein the control unit determines the weight of the food according to relation data on the weight of food to an intensity of an output signal of the weight sensor.

6. A method of detecting a weight of food of a cooking apparatus, the cooking apparatus including a cooking cavity to accommodate food to be cooked therein, a rotating unit installed within the cooking cavity to support the food and rotated rollers which are in rolling contact with a bottom surface of the cooking cavity, and a weight sensor installed at a portion of the cooking cavity on a movement path of the rollers to be temporarily pressurized by the rollers when the rotating unit rotates, the method comprising:
obtaining load output signals according to a pressurized degree from the weight sensor when the weight sensor is pressurized by the rollers;
obtaining no-load output signals from the weight sensor when the weight sensor is not pressurized by the rollers; and
calculating a difference between the no-load output signals and the load output signals;
calculating a mean value of the calculated difference when a preset number of differences is met; and
converting the mean value to a weight of the food according to relation data on a weight of food to an intensity of an output signal of the weight sensor.

UNITED STATES PATENT AND TRADEMARK OFFICE
CERTIFICATE OF CORRECTION

PATENT NO.        : 6,911,635 B2
APPLICATION NO.   : 10/739070
DATED             : June 28, 2005
INVENTOR(S)       : Jong-Chull Shon It is certified that error appears in the above-identified patent and that said Letters Patent is hereby corrected as shown below:

7. A method of detecting a weight of food of a cooking apparatus, the cooking apparatus including a cooking cavity to accommodate food to be cooked therein, a rotating unit installed within the cooking cavity to support the food and rotated by at least one roller which is in rolling contact with a bottom surface of the cooking cavity, and a weight sensor installed at a portion of the cooking cavity on a movement path of the at least one roller to be temporarily pressurized by the at least one roller when the rotating unit rotates, the method comprising:
obtaining at least one load output signal according to a pressurized degree from the weight sensor when the weight sensor is pressurized by the at least one roller;
obtaining at least one no-load output signal from the weight sensor when the weight sensor is not pressurized by the at least one roller; and
calculating at least one difference between the at least one no-load output signal and the at least one load output signal and converting the at least one difference to a weight of the food according to relation data on a weight of food to an intensity of an output signal of the weight sensor, wherein the calculating of the at least one difference comprises obtaining a number of differences between the no-load output signals and the load output signals, taking a mean value of remaining differences, except for maximum and minimum differences, among the number of differences, and
converting the mean value to the weight of the food.

8. A cooking apparatus having a cooking cavity therein to accommodate food, comprising:
a support unit provided in the cooking cavity to movably support the food, and having a moving unit at a portion of a bottom of the cooking cavity to move along a movement path;
a weight sensor provided adjacent to a part of the movement path such that the weight sensor is loaded by the support unit when the moving unit is adjacent to the weight sensor and the weight sensor is not loaded by the support unit when the moving unit is not adjacent to the weight sensor, and detecting load and no-load conditions of the support unit based on a pressure exerted from the support unit when the weight sensor is loaded and not loaded, respectively, the load and no-load conditions alternating according to a movement of the moving unit; and
a control unit to calculate a weight of the food on the support unit based on differences between the load and no-load conditions, wherein when a preset number of differences is met, the control unit calculates a mean value of the differences and converts the mean value to the weight of the food.

UNITED STATES PATENT AND TRADEMARK OFFICE
CERTIFICATE OF CORRECTION

PATENT NO.       : 6,911,635 B2
APPLICATION NO.  : 10/739070
DATED            : June 28, 2005
INVENTOR(S)      : Jong-Chull Shon It is certified that error appears in the above-identified patent and that said Letters Patent is hereby corrected as shown below:

14. A method of detecting a weight of food in a cooking apparatus, the cooking apparatus including a cooking cavity to accommodate food to be cooked therein, a support unit provided in the cooking cavity to movably support the food, and having a moving unit at a portion of a bottom of the cooking cavity to move along a movement path, and a weight sensor provided adjacent to a part of the movement path, the method comprising:
loading the weight sensor by the support unit when the moving unit is adjacent to the weight sensor;
unloading the weight sensor by the support unit when the moving unit is not adjacent to the weight sensor;
detecting load and no-load conditions of the support unit based on a pressure exerted from the support unit when the weight sensor is loaded and unloaded, respectively, while alternating the load and no-load conditions according to a movement of the moving unit; and
calculating differences between the load and no-load conditions;
calculating a mean value of the calculated difference when a preset number of differences is met; and
converting the mean value to a weight of the food on the support unit.

15. A method of detecting a weight of food in a cooking apparatus, the cooking apparatus including a cooking cavity to accommodate food to be cooked therein, a support unit provided in the cooking cavity to movably support the food, and having a moving unit at a portion of a bottom of the cooking cavity to move along a movement path, and a weight sensor provided adjacent to a part of the movement path, the method comprising:
loading the weight sensor by the support unit when the moving unit is adjacent to the weight sensor; unloading the weight sensor by the support unit when the moving unit is not adjacent to the weight sensor;
detecting load and no-load conditions of the support unit based on a pressure exerted from the support unit when the weight sensor is loaded and unloaded, respectively, while alternating the load and no-load conditions according to a movement of the moving unit; and
calculating a weight of the food on the support unit based on differences between the load and no-load conditions, wherein the calculating of the differences comprises, obtaining a number of differences between the no-load conditions and the load conditions,
calculating a mean value of remaining differences, except for maximum and minimum differences, among the number of differences, and
converting the mean value of the remaining differences to the weight of the food.

UNITED STATES PATENT AND TRADEMARK OFFICE
CERTIFICATE OF CORRECTION

| | |
|---|---|
| PATENT NO. | : 6,911,635 B2 |
| APPLICATION NO. | : 10/739070 |
| DATED | : June 28, 2005 |
| INVENTOR(S) | : Jong-Chull Shon |

It is certified that error appears in the above-identified patent and that said Letters Patent is hereby corrected as shown below:

19. A cooking apparatus having a cooking cavity therein to accommodate food, comprising:
a support unit to movably support the food;
a weight sensor provided under the support unit, and detecting load and no-load conditions of the support unit based on a pressure exerted from the support unit, and the load and no-load conditions alternating according to a movement of the support unit; and
a control unit to calculate a weight of the food based on differences between the load and no-load conditions, wherein when a preset number of differences is met the control unit calculates a mean value of the differences and converts the mean value to the weight of the food.

21. A method of detecting a weight of food in a cooking apparatus, the cooking apparatus including a cooking cavity to accommodate food to be cooked therein, a support unit provided in the cooking cavity to movably support the food, and a weight sensor provided at a part of a movement path of the support unit, the method comprising:
determining differences between load weight signals of the weight sensor and no-load weight signals of the weight sensor, while the support unit moves on the movement path;
calculating a mean value of the differences when a preset number of differences is met; and
converting the mean value to a weight of the food.

22. The food weight detection method according to claim 21, wherein the determining of the weight of the food is not influenced by a temperature variation of the cooking apparatus.

UNITED STATES PATENT AND TRADEMARK OFFICE
CERTIFICATE OF CORRECTION

PATENT NO. : 6,911,635 B2
APPLICATION NO. : 10/739070
DATED : June 28, 2005
INVENTOR(S) : Jong-Chull Shon It is certified that error appears in the above-identified patent and that said Letters Patent is hereby corrected as shown below:

24. A method of detecting a weight of food in a cooking apparatus, the cooking apparatus including a cooking cavity to accommodate food to be cooked therein, a support unit provided in the cooking cavity to movably support the food, and a weight sensor provided at a part of a movement path of the support unit, the method comprising:
determining a weight of food through a relative difference between a load weight on the weight sensor and a no-load weight on the weight sensor, while the support unit moves on the movement path, wherein the determining of the weight of the food comprises alternately loading and unloading the weight sensor, as the support unit moves along the movement path,
detecting load and no-load conditions of the support unit based on a pressure exerted from the support unit, and
calculating a weight of the food on the support unit based on differences between the load and no-load conditions, wherein
the detecting of the load and no-load conditions of the support unit comprises detecting a greater number of the no-load conditions than those of the load conditions, determining a mean value of the no-load conditions, and
the calculating of the weight of the food on the support unit comprises calculating of the weight of the food on the support unit based on differences between the load conditions and the mean value of the no-load conditions.--

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,911,635 B2 | Page 1 of 1 |
| APPLICATION NO. | : 10/739070 | |
| DATED | : June 28, 2005 | |
| INVENTOR(S) | : Jong-Chull Shon | |

It is certified that error appears in the above-identified patent and that said Letters Patent is hereby corrected as shown below:

Title Page, Item [56] Column 1, Line 1, change "Staas & Haslsey LLP" to --Staas & Halsey LLP--.

Signed and Sealed this

Twelfth Day of June, 2007

JON W. DUDAS
*Director of the United States Patent and Trademark Office*